United States Patent
Eliáš et al.

(10) Patent No.: US 9,602,629 B2
(45) Date of Patent: Mar. 21, 2017

(54) SYSTEM AND METHOD FOR COLLABORATIVE PROCESSING OF SERVICE REQUESTS

(71) Applicant: Red Hat, Inc., Raleigh, NC (US)

(72) Inventors: Filip Eliáš, Vysni Lhoty (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 496 days.

(21) Appl. No.: 14/054,007

(22) Filed: Oct. 15, 2013

(65) Prior Publication Data

US 2015/0106428 A1     Apr. 16, 2015

(51) Int. Cl.
| | |
|---|---|
| G06F 15/16 | (2006.01) |
| H04L 29/06 | (2006.01) |
| G06F 9/50  | (2006.01) |
| H04L 29/08 | (2006.01) |
| G06F 9/54  | (2006.01) |

(52) U.S. Cl.
CPC ............ H04L 67/42 (2013.01); G06F 9/5061 (2013.01); G06F 9/547 (2013.01); H04L 67/1008 (2013.01)

(58) Field of Classification Search
CPC .... H04L 67/42; H04L 67/1008; G06F 9/5061
See application file for complete search history.

(56) References Cited

U.S. PATENT DOCUMENTS

| | | | |
|---|---|---|---|
| 5,457,797 A    | 10/1995 | Butterworth et al. | |
| 6,011,918 A *  |  1/2000 | Cohen .................. | G06F 8/30 709/201 |
| 7,458,082 B1   | 11/2008 | Slaughter et al.   | |
| 8,412,791 B2   |  4/2013 | Agarwalla et al.   | |
| 9,244,709 B2 * |  1/2016 | Aslam ................. | G06F 9/45529 |
| 2004/0001476 A1* |  1/2004 | Islam .................. | G06F 9/546 370/352 |

(Continued)

OTHER PUBLICATIONS

Maheshwari, P., "Enterprise Application Integration Using a Component-Based Architecture," Sch. of Computer Sci. & Eng., New South Wales Univ., Sydney, http://ieeexplore.ieee.org/xpl/login.jsp?tp=&arnumber=1245395&url=http%3A%2F%2Fieeexplore.ieee.org%2Fxpls%2Fabs_all.jsp%3Farnumber%3D1245395 , Nov. 3-6, 2003, 6 pages.

(Continued)

*Primary Examiner* — June Sison
(74) *Attorney, Agent, or Firm* — Haynes & Boone, LLP

(57) ABSTRACT

A system and method of collaborative processing of service requests includes receiving a service request at an application server, beginning execution of a proxy member function of a proxy class, and determining whether a movable member function in a movable class is to be executed at a client. When the movable member function is to be executed at the client, the method further includes creating a partial response including code for the movable class and information for invoking the movable member function and transmitting the partial response to the client fore execution of the movable member function. When the movable member function is not to be executed at the client, the method further includes executing the movable member function in the application server and returning a result of the movable member function as a result of the proxy member function. The proxy member function replaces the movable member function.

20 Claims, 7 Drawing Sheets

(56) References Cited

U.S. PATENT DOCUMENTS

| | | | | |
|---|---|---|---|---|
| 2005/0203962 A1* | 9/2005 | Zhou | G06F 9/5044 | |
| 2006/0230319 A1* | 10/2006 | Ryali | G06F 11/3688 | 714/38.14 |
| 2008/0270515 A1* | 10/2008 | Chen | G06F 9/4856 | 709/202 |
| 2009/0006531 A1 | 1/2009 | Gillum et al. | | |
| 2009/0007147 A1* | 1/2009 | Craft | G06F 9/455 | 719/320 |
| 2009/0125611 A1* | 5/2009 | Barsness | H04L 67/34 | 709/220 |
| 2010/0153484 A1* | 6/2010 | Tatsubori | H04L 67/42 | 709/203 |
| 2011/0078672 A1* | 3/2011 | Stark | G06F 9/44536 | 717/166 |
| 2011/0145360 A1* | 6/2011 | Sheshagiri | G06F 8/51 | 709/217 |
| 2011/0320520 A1* | 12/2011 | Jain | G06F 9/5072 | 709/203 |
| 2013/0047155 A1* | 2/2013 | Caspole | G06F 9/445 | 718/1 |

OTHER PUBLICATIONS

Nakamur, Y. et al., "Towards the Integration of Web Services Security on Enterprise Environments," 2002 Symposium on Applications and the Internet (SAINT) Workshops, 2002 Proceedings, http://ieeexplore.ieee.org/xpl/login.jsp?tp=&arnumber=994567 &url=http%3A%2F%2Fieeexplore.ieee.org%2Fxpls%2Fabs_all. jsp%3Farnumber%3D994567 , 10 pages.

Oracle Corporation, "Overview of Oracle Enterprise Manager," Concepts Guide Release 9.0.1. Part No. A88770-01, 2001, Retrieved from web Oct. 15, 2013, 13 pages.

IBM Info Center, "HTTP session rebalancing," International Business Machines Corporation, http://pic.dhe.ibm.com/infocenter/ wxdinfo/v6r0/index.jsp?topic=%2Fcom.ibm.websphere.xd. doc%2Finfo%2Fodoe_task%2Fcodrsessionbalance.html , Last updated Feb. 25, 2010, 6 pages.

* cited by examiner

500

```
@Stateless
@WebService
public class ClassA { public int method1 (int x, int y) {
      int z = ClassB.getZ(x, y);
      // Remaining implementation of method 1
   } public boolean method2(int number) {
       // Implementation of method 2
   }

// Remaining implementation of ClassA

}
}
@MovableClass
public class ClassB {
   public static int getZ(int a, int y) {
      // Implementation of getZ
      return z;
   }

// Remaining implementation of ClassB

}
```

510 — @Stateless/@WebService/public class ClassA
520 — int z = ClassB.getZ(x, y);
530 — @MovableClass
540 — public class ClassB
550 — public static int getZ

FIG. 5

```
public class ClassB {
    public static int getZ(int x, int y) {
        if (CollaborationManager.processAtClientSide()==true) { // process method at client side
            int result = CollaborationManager.getResultFromClient(serviceName+className, "getZ", x, y);
            return result;
        }
        else {  // process method at server side
            new Class originalClass = MovableClassStorage.getClass(serviceName+className);
            int z = originalClass.getZ(x, y);
            return z;
        }
    }
}
```

FIG. 6

SYSTEM AND METHOD FOR COLLABORATIVE PROCESSING OF SERVICE REQUESTS

BACKGROUND

The present disclosure relates generally to computing systems, and more particularly to collaborative processing of service requests.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computers, processors, and software systems often share information and provide computing services for each other. In order to do so, a server or some other computing system may provide an interface through which service requests are made by the other computing devices or clients. In these service-oriented architectures (SOAs), the clients generally make a service request by sending a request message to the server hosting the service using, for example, a networking protocol. The server receives the message, activates the requested service, and returns a response message with the result. For example, a very basic form of services is demonstrated by a request for a web page. A client, such as a web browser, sends a Hypertext Transport Protocol (HTTP) request to a web server which receives the HTTP request and generates a response containing the requested web page, that is then returned to the web browser. Most computing systems and clients have access to many servers providing a large array of services that the clients are able to use. This client-server approach, however, does not generally include overt handling of load-related issues. For example, when clients are able to freely select the servers which provide each of the requested services, there are often few controls and/or management mechanisms that prevent and/or limit service requests from being concentrated in one or more servers, which may become overloaded with service requests and then may become, correspondingly less responsive in processing those service requests. This may be further exacerbated by the use of highly compute- and/or resource-intensive services that are being requested by client systems via processing scripts, programs, and other services.

Accordingly, it would be desirable to provide improved systems and methods for managing the processing loads of servers.

SUMMARY

According to one example, a method of processing a service request includes receiving the service request at an application server running on a computer server, beginning execution of a proxy member function of a proxy class, and determining whether a movable member function in a movable class is to be executed at a client. When the movable member function is to be executed at the client, the method further includes creating a partial response including executable code for the movable class and information for invoking the movable member function and transmitting the partial response to the client to allow the client to execute the movable member function. When the movable member function is not to be executed at the client, the method further includes accessing the movable member function in movable class storage of the application server, executing the movable member function from the movable class storage, and returning a result of the movable member function as a result of the proxy member function. The service request is received from the client. The proxy member function replaces the movable member function in the movable class.

According to another example, a method of processing a service request includes receiving a service for deployment by an application server running on a computer server, detecting that the service includes a movable class, extracting the movable class from the service, moving the movable class to movable class storage of the application server, creating a proxy class for the movable class, replacing the movable class with the proxy class in the service, receiving the service request for the service at the application server, beginning execution of a proxy member function of the proxy class, and determining whether a movable member function is to be executed at a client. When the movable member function is to be executed at the client, the method further includes creating a partial response including executable code for the movable class and information for invoking the movable member function and transmitting the partial response to the client to allow the client to execute the movable member function. When the movable member function is not to be executed at the client, the method further includes accessing the movable member function in a movable class storage of the application server, executing the movable member function from the movable class storage, and returning a result of the movable member function as a result of the proxy member function. The proxy class has a same class name as the movable class and a same public interface as the movable class. The service request is received from the client. The proxy member function replaces the movable member function in the movable class.

According to yet another example, a non-transitory machine-readable medium comprising a first plurality of machine-readable instructions which when executed by one or more processors associated with an application server are adapted to cause the one or more processors to perform a method. The method includes receiving a service request for a service at the application server. The service request is received from a client. The method further includes beginning execution of a proxy member function of a proxy class. The proxy member function replaces a corresponding movable member function in a movable class. The method further includes determining whether the movable member function is to be executed at the client. When the movable member function is to be executed at the client, the method additionally includes creating a partial response including executable code for the movable class and information for invoking the movable member function and transmitting the partial response to the client to allow the client to execute the movable member function. When the movable member function is not to be executed at the client, the method additionally includes accessing the movable member function in movable class storage of the application server, executing the movable member function from the movable class storage, and returning a result of the movable member function as a result of the proxy member function.

BRIEF DESCRIPTION OF THE DRAWINGS

FIG. 5 is a simplified diagram of a portion of a service that includes a movable class according to some examples.

FIG. 6 is a simplified diagram of a proxy class that replaces the movable class in the portion of the service shown in FIG. 5 according to some examples.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
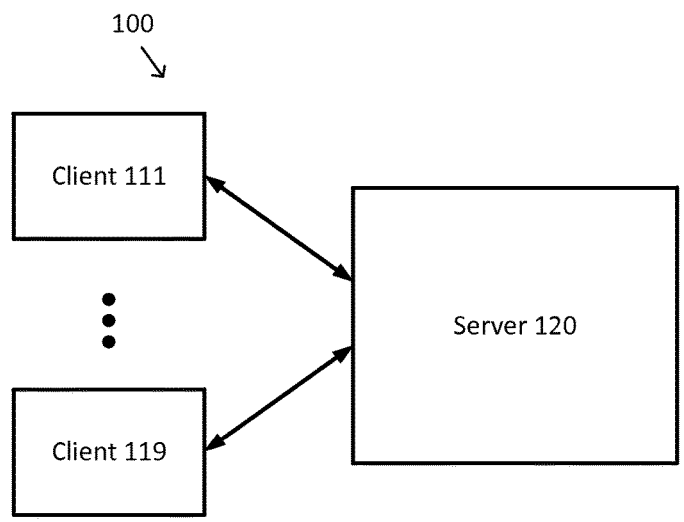
FIG. 1 is a simplified diagram of a service-oriented architecture (SOA) according to some examples.

FIG. 1 is a simplified diagram of a service-oriented architecture (SOA) 100 according to some examples. As shown in FIG. 1, SOA 100 is built around a client-services model. In SOA 100, service requests originate from one or more clients 111-119. Each of the clients 111-119 may make service requests that are being hosted by a server 120. Each of the clients 111-119 may transmit one or more service request messages to server 120, which may in turn direct each of the service requests to the service identified in the respective service request. Numerous mechanisms for directing the service requests to the respective service may be used including providing a uniform resource locator (URL) for the service in the respective service request, providing a service name of the service in the respective service request, and/or the like. The service requests may also be made using protocols such as remote procedure call, web services, and/or the like. In some examples, clients 111-119 may use one or more networks (not shown) to route service requests to server 120.

In some examples, client-server models, like those shown in SOA 100, often include a limited ability to manage the workload of server 120. In some examples, server 120 may accept service requests until server 120 no longer has sufficient computing, memory, and/or other resources to continue handling further service requests. In some examples, server 120 may become less responsive as it is called upon to handle more and more service requests. In some examples, server 120 may reach a point where server 120 may have no choice but to ignore one or more new service requests and/or drop one or more service requests already being processed. In some examples, server 120 may use a priority-based system for selecting the service requests to handle and the service requests to ignore and/or drop. In some examples, this approach may not be very client-friendly as clients are left either to wonder why a request for service has not received a response and/or are forced to delay until the server has sufficient resources to complete the service requests.

Figure 2:
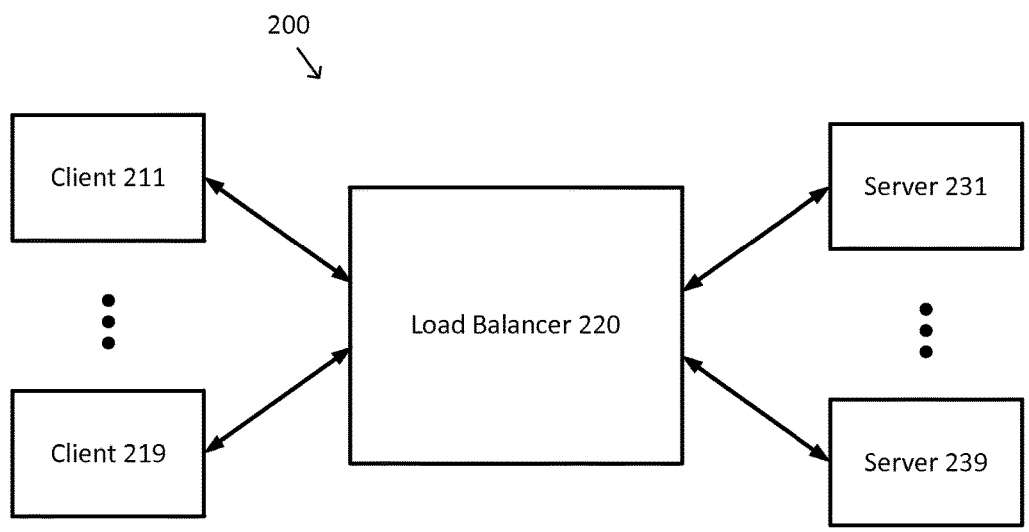
FIG. 2 is a simplified diagram of a load-balancing SOA according to some examples.

FIG. 2 is a simplified diagram of a load-balancing SOA 200 according to some examples. As shown in FIG. 2, SOA 200 employs a more sophisticated approach to managing server workload than does SOA 100. Like SOA 100, SOA 200 includes one or more clients 211-219. In some examples, the clients 211-219 may by similar to clients 111-119. However, unlike SOA 100, SOA 200 includes a load balancer 220 as well as one or more servers 231-239. SOA 200 uses load balancer 220 to better manage the workload of each of the servers 231-239. In some examples, load balancer 220 may monitor the workload of each of the servers 231-239 in order to evaluate how busy each of the servers 231-239 may be. In some examples, load balancer 220 may monitor processor usage, memory usages, and/or other workload indicators for each of the servers 231-239.

Load balancer 220 may further act as an arbiter for each of the servers 231-239. Rather than make service requests directly to servers 231-239, the clients 211-219 may make their service requests through load balancer 220. As load balancer 220 receives service requests from clients 211-219, load balancer 220 may examine each of the service requests and then direct the service requests to one or more of the servers selected from servers 231-239 based on the monitored workloads of the servers 231-239. This may allow load balancer 220 to direct service requests to servers with lighter workloads and/or to avoid overloading any of the servers 231-239.

The use of load balancer 220, however, may not address all of the issues associated with workload management. First, addition of load balancer 220 adds another complex component to SOA 200. As such, load balancer 220 may become an additional source of failure in SOA 200. Load balancer 220 may also become a bottle neck when too many service requests are received resulting in the same kinds of issues observed for the single-server SOA 100. Additionally, load balancer 220 may require an additional piece of expensive hardware and/or software in SOA 200.

Figure 3:
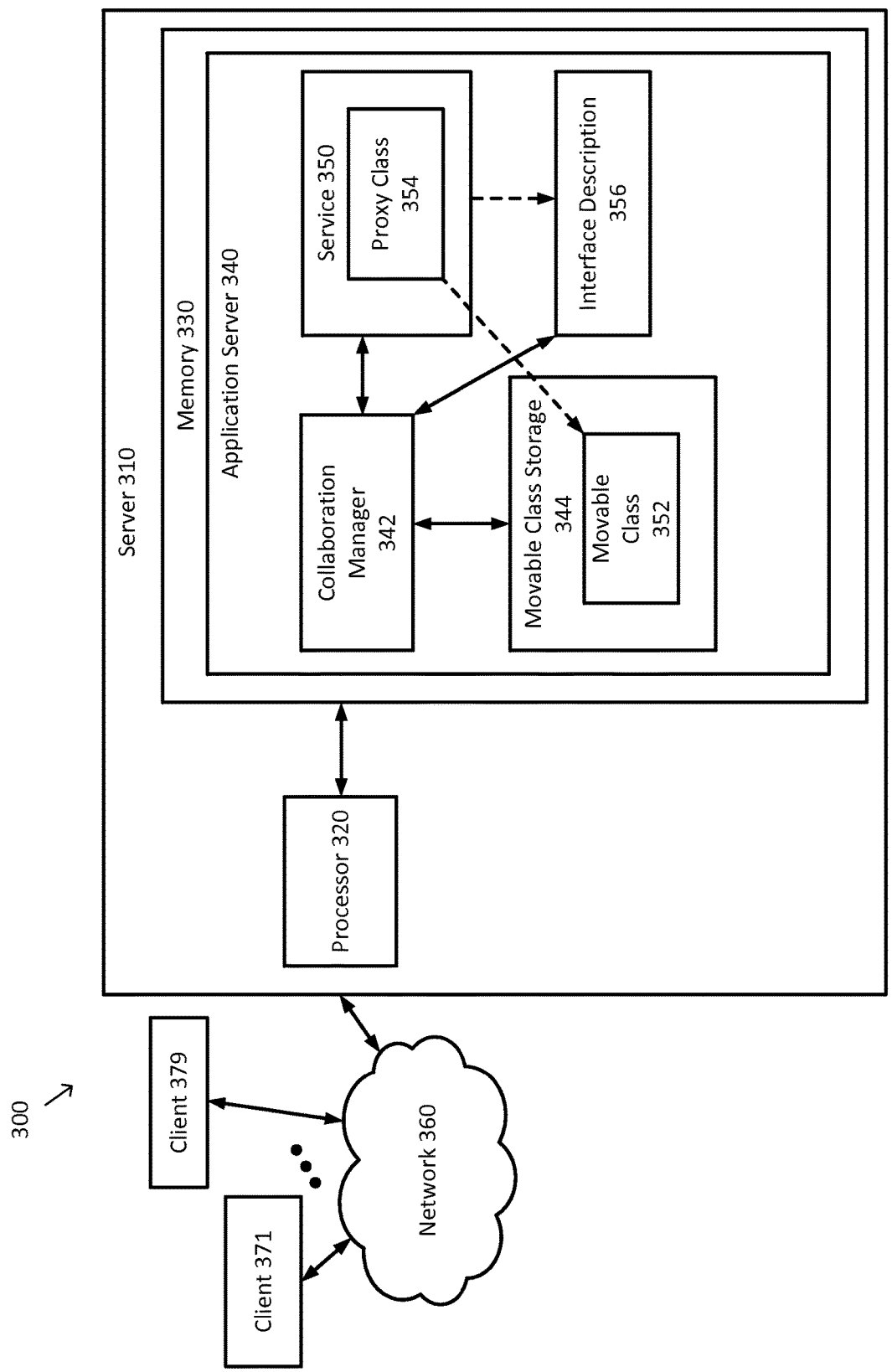
FIG. 3 is a simplified diagram of a collaborative SOA according to some examples.

FIG. 3 is a simplified diagram of a collaborative SOA 300 according to some examples. As shown in FIG. 3, SOA 300 is built around a server 310. In some examples, server 310 may be a standalone workstation, a cluster, a production server, within a virtual machine, and/or the like. Server 310 includes a processor 320 coupled to memory 330. In some examples, processor 320 may control operation and/or execution of hardware and/or software on server 310. Although only one processor 320 is shown, server 310 may include multiple processors, multi-core processors, and/or the like. Memory 330 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 330 may be used to store an application server 340. Application server 340 includes one or more interfaces for receiving service requests from one or more clients, such as the one or more clients 371-379 that are shown coupled to server 310 using a network 360. Network 360 may be any kind of network including a local area network (LAN), such as an Ethernet, and/or a wide area network (WAN), such as the internet. Although not explicitly shown in FIG. 3, application server 340 may be hosted in one or more virtual machines and/or Java virtual machines running on server 310. In some examples, server 310 and/or memory 330 may also be used to host more than one application server.

Unlike a comparable application server that may be found in any of the servers 120 and/or 231-239, application server 340 is built around a collaborative processing model. More particularly, application server 340 may include a collaboration manager 342 and movable class storage 344. Collaborative manager 342 operates by dividing each service into portions of the service that are handled/processed at server 310 and portions of the service that may be collaboratively handled/processed at server 310 or alternatively at another computing device in SOA 300. In some examples, the another computing device may be any of the computing devices hosting clients 371-379.

As part of its operation, collaboration manager 342 identifies movable classes in each of the services being hosted by application server 340 and replaces each of the movable classes with a corresponding proxy class that allows the movable classes to be executed either at server 310 or at one of the clients 371-379.

Operation of collaboration manager 342 is now described relative to a representative service 350 that is deployed at server 310 and within application server 340. When service 350 is received at application server 340 for deployment, collaboration manager 342 examines service 350 to determine whether it includes any movable classes. In some examples, a class is movable when it may be executed either at server 310 or at a client computing device. In some examples, movable classes are those classes that include only static member functions and variables, are serializable, and further do not include instance variables. As shown in FIG. 3, service 350 is shown with a movable class 352, although it is understood that service 350 may include additional movable classes that are not shown. Once movable class 352 is identified, collaboration manager 342 removes movable class 352 from service 350, moves movable class 352 to movable class storage 344, and replaces movable class 352 with a proxy class 354 in service 350. Proxy class 354 is designed to either execute movable class 352 from movable class storage 344 when movable class 352 is to be executed at server 310 or to direct collaboration manager 342 to send movable class 352 to the client for execution at the client. In some examples, proxy class 354 is given the same public interfaces and signatures as movable class 352 so that the other software that implements service 350 may call the proxy class 354 in place of movable class 352 without having to be rewritten and/or recompiled. In some examples, movable class 352 may be unchanged as well when it is moved to movable storage 344 so that it does not need to be recompiled either. In some examples, this may be done without causing a name conflict between proxy class 354 and movable class 352 by using a separate class loader for movable class storage 344. In some examples, movable class 352 may be name mangled when it is moved to movable class storage 344 to avoid name conflicts when a separate class loader is not used for movable class storage 344. In some examples, collaboration manager 342 may also update the interface description 356 for service 350 to indicate that service 350 includes one or more movable classes that may be collaboratively executed.

Collaboration manager 342 may further support run-time execution of service 350. When a service request identifying service 350 is received by application server 340 from a client, such as any of the clients 371-379, collaboration manager 342 may examine the service request to determine whether the client has indicated that it may provide collaborative execution. In some examples, the service request may include a status variable and/or a flag that the client may use to indicate support for collaborative execution. In some examples, the client may register in advance with collaboration manager 342 that the client may support collaborative execution. In some examples, collaboration manager 342 may also monitor the workload of server 310 to determine whether server 310 may have sufficient resources to fully execute service 350 itself and/or whether collaborative execution is to be used. As proxy class 354 is executed at server 310, a decision is made whether to execute movable class 352 at server 310 or at the client. In some examples, the decision may be based on the indications from the client and/or the monitored server workload. When movable class 352 is to be executed at server 310, it is located in movable class storage 344 and then executed from there. When movable class 352 is to be executed at the client, a partial response to the service request is created that includes the executable code for movable class 352 and a version of the software call that invoked movable class 352, including the parameters used to make the software call in serialized form. In some examples, the partial response may further include a final flag and/or indicator as to whether execution of movable class 352 will complete processing for the service request or whether additional processing for the service request is to occur at server 310. The partial response may then be returned to the client. In some examples, when the partial response includes the final flag and/or indicator, the client may complete processing for service 350 and no further exchange may occur between the client and application server 340. In some examples, when the partial response does not include the final flag and/or indicator, the client may make a continuing request to application server 340, once the collaborative execution of movable class 352 at the client is complete, so that further execution of service 350 may occur at server 310.

Collaborative execution of movable class 352 between server 310 and/or the client may provide a helpful way to provide load shifting from server 310 to the client. When the workload of server 310 starts to become overloaded, proxy class 354, with the help of collaboration manager 342, may be able to recognize the potential overload and send movable class 352 to the client for collaborative execution using a partial response. And while use of the partial response may add computing and network overhead to server 310, when movable class 352 is compute- and/or resource-intensive, the resulting savings in processor time, memory resources, and/or the like may be sufficient to justify the overhead of proxy class 354, the partial response with the collaborative execution request, and a continuing request, if any, that results after the collaborative execution is completed at the client.

Figure 4:
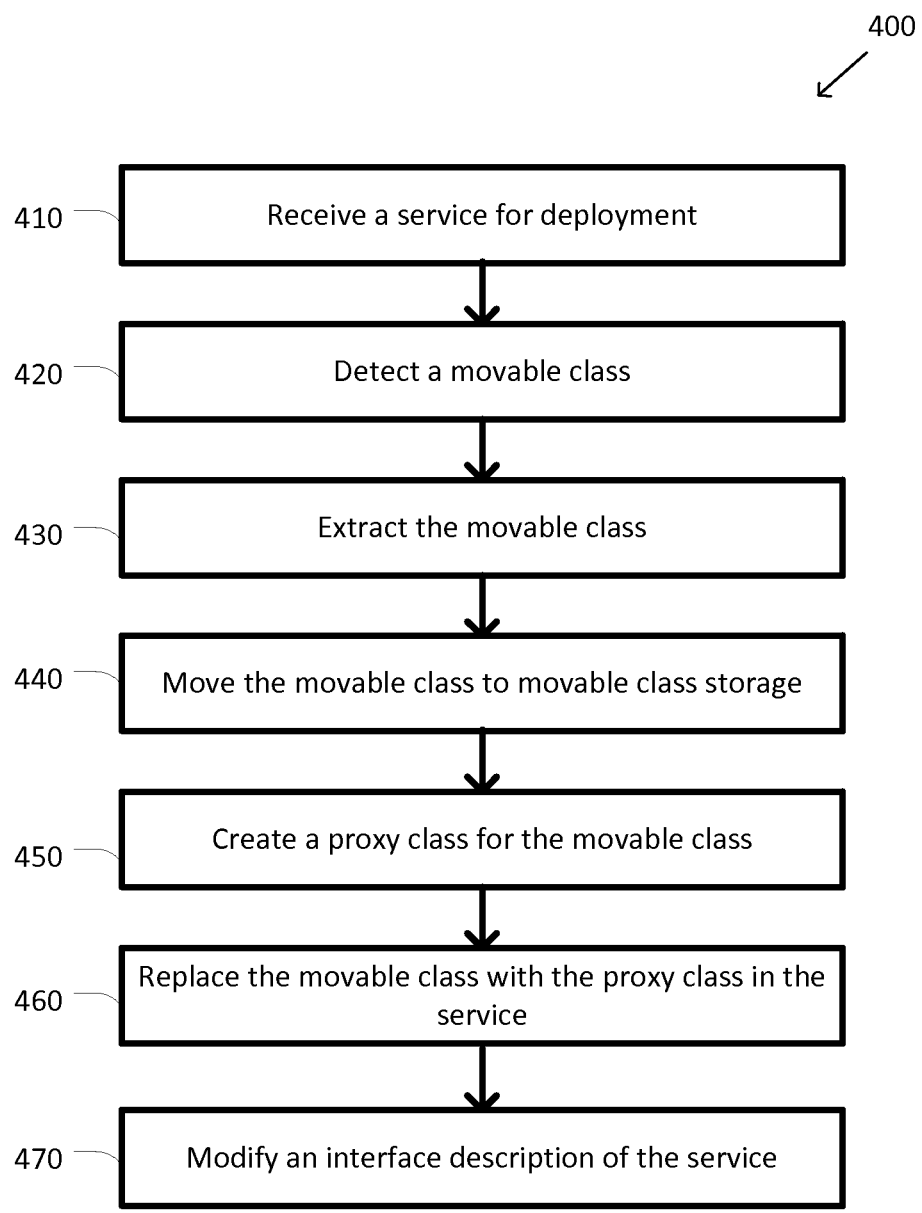
FIG. 4 is a simplified diagram of a method of deploying a service according to some examples.

FIG. 4 is a simplified diagram of a method 400 of deploying a service according to some examples. In some examples, one or more of the processes 410-470 of method 400 may be implemented, at least in part, in the form of executable code stored on non-transient, tangible, machine readable media that when run by one or more processors (e.g., the processor 320 of server 310) may cause the one or more processors to perform one or more of the processes 410-470. In some examples, method 400 may be used by application server 340 and/or collaboration manager 342 to receive and process service deployment requests. Method 400 is merely representative, and in some examples, the process 470 may be optional.

At a process 410, a service is received for deployment. An application server, such as application server 340, may receive a request to deploy a service so that one or more clients, such as clients 371-379, may use the service. In some examples, the request may be received from an IT manager. In some examples, the request may be received as part of an installation request. In some examples, the service may be included as part of an archive file such as a Java ARchive (JAR) file, a Web ARchive file (WAR), an Enterprise ARchive (EAR) file, and/or the like.

At a process 420, a movable class is detected. The service that is received for deployment during process 410 is examined to determine whether it contains any movable classes. In some examples, the movable classes may be detected based on one or more properties. In some examples, a movable class may be identified by a special tag added to the movable class by the developer of the class. In some examples, a movable class may be identified by one or more entries included in one or more configuration files that are distributed with the service. In some examples, the configuration files may be located in a META-INF, a WEB-INF, and/or some other similar type of metadata folder included in the archive file containing the service. In some examples, a movable class may be identified as a class that includes only static member functions and variables, is serializable, and further does not include instance variables.

FIG. 5 is a simplified diagram of a portion 500 of a service that includes a movable class according to some examples. As shown in FIG. 5, the portion 500 of the service is shown using the Java programming language, but it is understood that any other suitable programming language for use in defining services may be used and/or adapted similarly to the examples of FIG. 5. The portion 500 of the service includes several classes. Starting at a source code line 510, a class named ClassA is defined. As ClassA includes at least two non-static member functions, method1 and method2, it is unlikely to make a suitable candidate for a movable class.

At a source code line 530, a specialized tag "@MovableClass" is included in the source code to indicate that the class that follows may be treated as a movable class. Like other specialized tags, "@MovableClass" may be used to indicate that the object that follows, in this case ClassB, has the indicated property. At a source code line 540, the definition for ClassB begins. At a source code line 550, a static member function, getZ, of ClassB is defined, At a source code line 520, method1 of ClassA calls member function getZ of ClassB. Line 520 demonstrates a common way for a non-movable class (ClassA) to make use of a static member function of a movable class (ClassB) to perform a computation.

Referring back to FIG. 4 and process 420, the presence of the "@MovableClass" tag on line 530 indicates that ClassB is a movable class that may be detected by the application server and/or the collaboration manager during process 420. ClassB is generally received in compiled form when the service is deployed. In some examples, ClassB may in the form of a class file included in the archive file containing the service.

At a process 430, the movable class is extracted. The movable class is removed from the service so that the movable class and its member functions may not be executed directly by the other classes and functions of the service. In some examples, when the movable class is in the form of a class file, the class file is extracted and/or removed from the archive for the service. In the examples of FIG. 5, the class file containing ClassB would be removed from the archive file received during process 410.

At a process 440, the movable class is moved to movable class storage. The movable class extracted during process 430 is moved and installed into movable class storage. In some examples, the movable class storage may be movable class storage 344. In the examples, of FIG. 5, the executable code in the class file containing ClassB may be stored in the movable class storage. In some examples, one or more data structures may be updated so that a class loader can find the movable class in the movable class storage. In some examples, the one or more data structures may be indexed by service and class name so that the one or more data structures may be used to uniquely identify and/or locate each movable class stored in the movable class storage. In some examples, the name of the movable class may be mangled to avoid a name conflict with a proxy class that is created during a process 450.

At the process 450, the proxy class corresponding to the movable class is created. The proxy class that is to replace the movable class extracted during process 430 is created. The proxy class includes at least the same name, public member functions, and public member function signatures as the movable class it is replacing. This allows the proxy class to be called in place of the movable class without having to recompile the source code for the rest of the service.

FIG. 6 is a simplified diagram of a proxy class 600 that replaces the movable class in portion 500 of the service shown in FIG. 5 according to some examples. As shown in FIG. 6, proxy class 600 includes a declaration for ClassB on a source code line 610 that is the same as the movable class defined in FIG. 5 at line 540. A source code line 620 further shows that proxy class 600 includes a proxy version of the member function getZ with the same signature as the getZ member function of the movable class as shown in FIG. 5 at line 550.

FIG. 6 also shows other features of proxy class 600. A source code line 630 shows the inclusion of a run-time test, performed with the aid of the collaboration manager, to determine whether the movable class is to be executed at the server or collaboratively at the client. A source code line 640 shows proxy class 600 using the collaboration manager to request that the movable class be executed at the client. A source code line 650 shows proxy class 600 using the movable class storage to access the movable class. A source code line 660 shows proxy class 600 invoking the corresponding member function of the movable class, and a source code line 670 shows the proxy member function returning as its result the result from the member function of the movable class. The operation of lines 630-670 is discussed in further detail below with respect to FIG. 7.

Referring back to FIG. 4, the proxy class is created so that each of the member functions in the movable class extracted during process 430 is replaced with a corresponding proxy member function. In the examples of FIGS. 5 and 6, each member function of the movable class would be replaced with proxy member functions similar to the example shown for the member function getZ. In some examples, once the proxy class is created, it is compiled.

At a process 460, the movable class is replaced with the proxy class in the service. The movable class extracted during process 430 is replaced in the service by the proxy class created during process 450. In some examples, the class file corresponding to the movable class removed from the service archive file may be replaced by the class file corresponding to the compiled proxy class.

At an optional process 470, an interface description of the service is modified. In some examples, when the application server supports the publishing and/or discovery of interface descriptions for the deployed services, the interface description, such as interface description 356, may be updated to reflect the replacement of the movable class with the proxy class. In some examples, the interface description may be updated to indicate that the service may support collaborative execution of one or more movable classes. In some examples, the modified interface description may indicate to potential clients that a service request for the corresponding service may include a status variable and/or a flag indicating whenever the potential client is willing to provide support for collaborative execution of the requested service.

After completion of process 470, examination of the service received during process 410 may continue by detecting and processing additional movable classes using processes 420-470 until each of the additional movable classes have been replaced with corresponding proxy classes.

Figure 7:
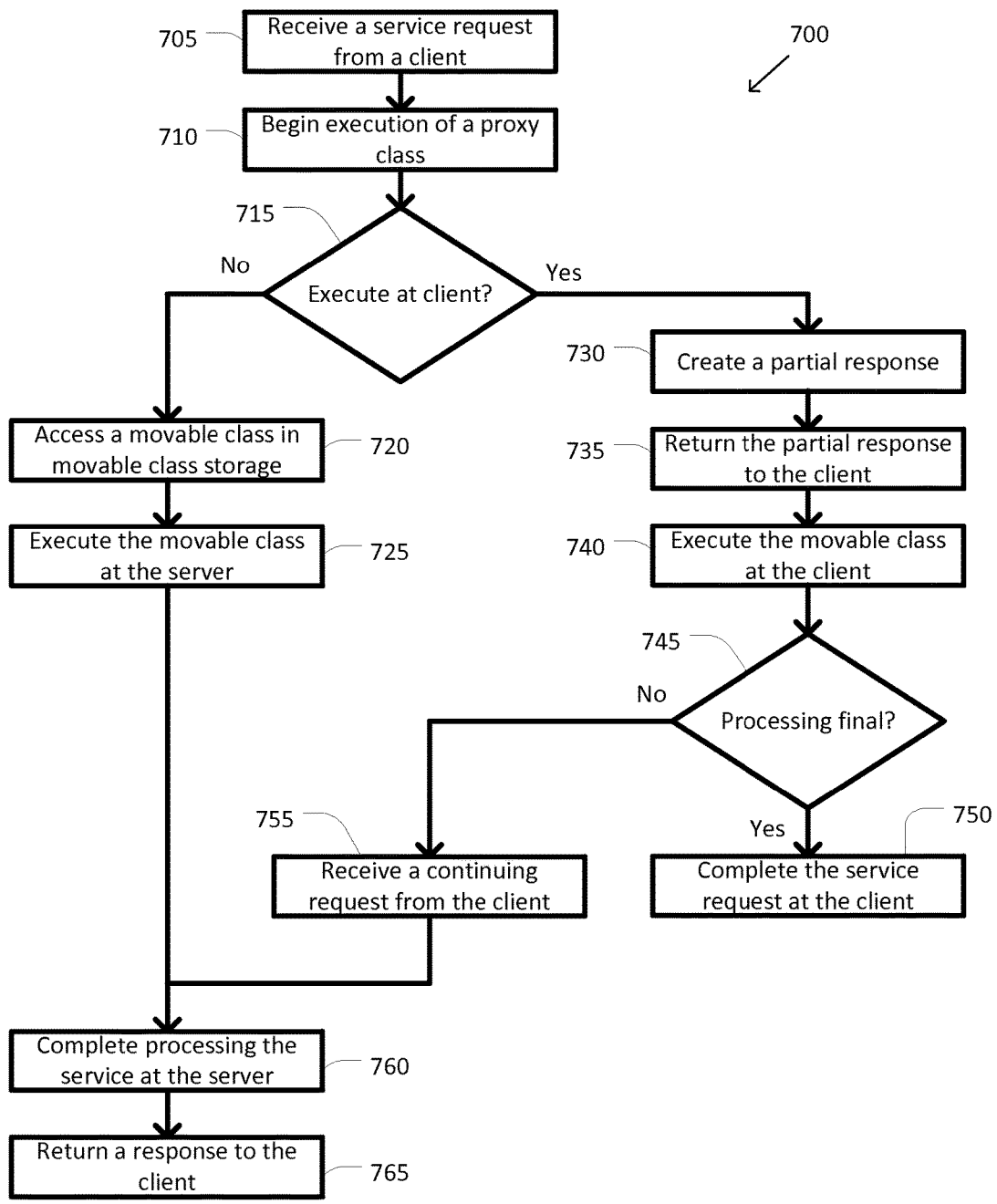
FIG. 7 is a simplified diagram of a method of executing a service according to some examples.

FIG. 7 is a simplified diagram of a method 700 of executing a service according to some examples. In some examples, one or more of the processes 705-765 of method 700 may be implemented, at least in part, in the form of executable code stored on non-transient, tangible, machine readable media that when run by one or more processors (e.g., the processor 320 of server 310) may cause the one or more processors to perform one or more of the processes 705-765. In some examples, method 700 may be used by application server 340 and/or collaboration manager 342 to receive and process service requests from clients such as clients 371-379. Method 700 is merely representative, and in some examples, one or more of the processes 745 and/or 750 may be optional.

At a process 705, a service request received from a client. In some examples, the service request may be received by an application server, such as application server 340. In some examples, the service request may be received from a client of the application server, such as any of the clients 371-379. In some examples, the request for service may be received over a network, such as network 360. In some examples, the service request may ask the application server to execute a service, such as service 350, using one or more parameters and/or data included in the service request. Upon receipt of the service request, the application server begins processing of the service.

At a process 710, execution of a proxy class begins. When the service corresponding to the request for service received during process 705 includes a function call that invokes a member function of a movable class, a corresponding proxy member function in a proxy class is called instead. In the examples of FIGS. 5 and 6, when the call to member function getZ of ClassB is executed on line 520, the proxy member function beginning at 620 is called instead, and execution of the proxy version of ClassB begins.

At a process 715, it is determined whether the movable class is to be executed at the client. In some examples, the application server may rely on the collaboration manager to determine whether the invoked member function of the movable class may be executed at the client or at the server. In the examples of FIG. 6, this corresponds to the call to CollaborationManager.processAtClientSide( ) on line 630.

Figure 8:
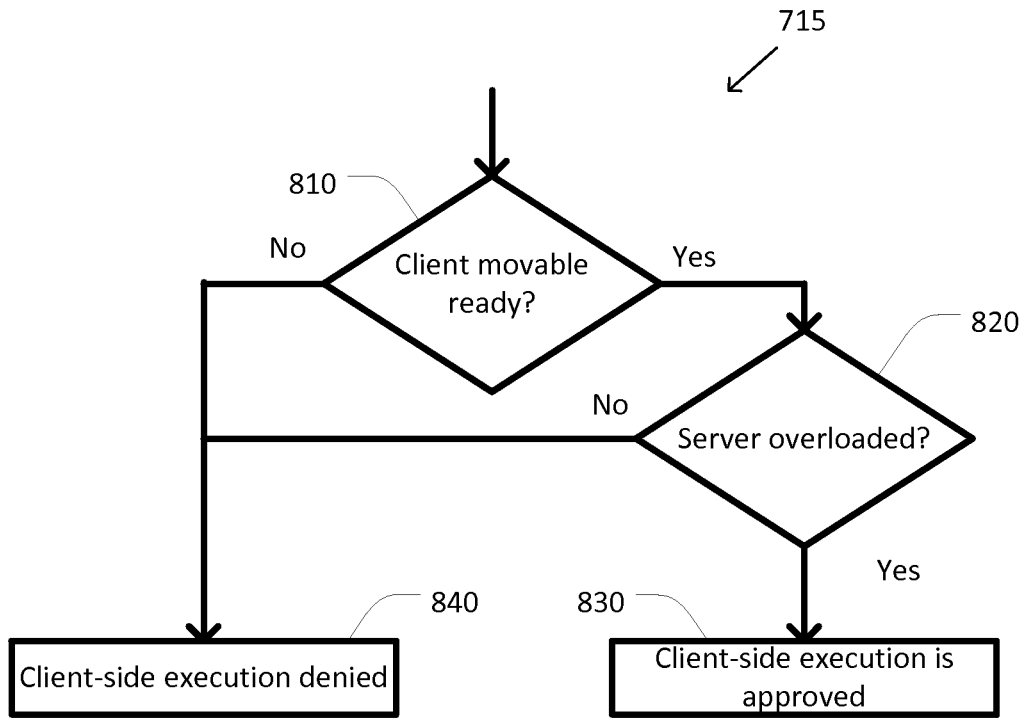
FIG. 8 is a simplified diagram of a process for determining whether the movable class is to be executed at the client according to some examples.

FIG. 8 is a simplified diagram of the process 715 for determining whether the movable class is to be executed at the client according to some examples. In some examples, one or more of the processes 810-840 of process 715 may be implemented, at least in part, in the form of executable code stored on non-transient, tangible, machine readable media that when run by one or more processors (e.g., the processor 320 of server 310) may cause the one or more processors to perform one or more of the processes 810-840.

At a process 810, it is determined whether the client is movable ready. Before the application server may ask a client to collaboratively execute a movable class within the service, the client that made the request may indicate whether it is able and willing to support collaborative execution. In some examples, a client that does not support collaborative execution is not movable ready. In some examples, the client may indicate that it is movable ready by including a status variable and/or a flag in the service request received during process 705. In some examples, the client may register with the application server and/or the collaboration manager prior to making the request for service received during process 705. As part of this registration, the client may indicate that it can support collaborative execution of subsequently requested services. When the client it not movable ready, client-side execution is denied using a process 840. When the client is movable ready, a status of the server is examined during a process 820.

At the process 820, it is determined whether the server is overloaded. In some examples, because collaborative execution at the client may introduce overhead, collaborative execution at the client is not typically requested unless the server is becoming overloaded. During process 820, the status of the server is examined to determine whether the server is overloaded and/or may become potentially overloaded.

Figure 9:
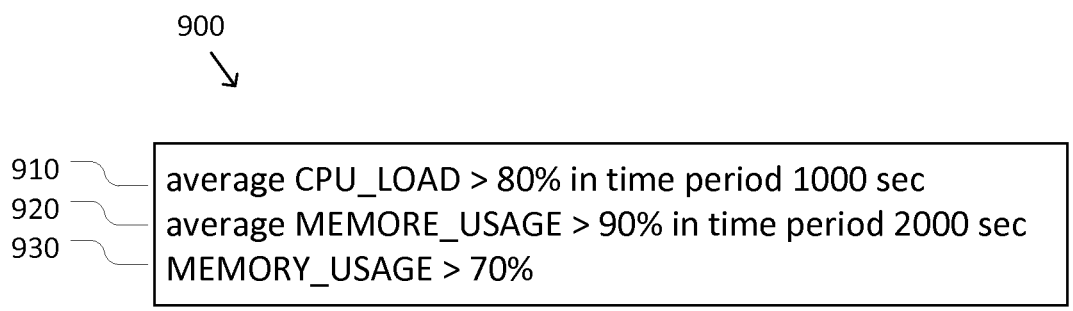
FIG. 9 is a simplified example of representative rules that may be used to determine whether the server is overloaded according to some examples.

In some examples, the application server and/or the collaboration manager may determine whether the server is overloaded using a rule-based process. In some examples, the use of a rule-based determination of whether the server is overloaded may support flexible adjustment of the overload test performed during process 820 by allowing for run time adjustment and/or update of the rule set used to determine whether the server is overloaded. In some examples, the rules may consider utilization of one or more resources of the server including central processing unit (CPU)/processor usage, memory usage, number of pending service requests, and/or the like. In some examples, the rules may include one or more aggregation functions, such as minimum, maximum, average, and/or the like, that examine resource usage in the server over flexibly defined periods of time. In some examples, the rules may be applied independently so that if any rule determines that the server is overloaded, that rule would override the conclusion of the other rules. FIG. 9 is a simplified example of representative rules that may be used to determine whether the server is overloaded according to some examples. A rule 910 determines that the server is overloaded when the average CPU usage over the previous 1000 seconds exceeds 80% of CPU capacity. A rule 920 determines that the server is overloaded when the average memory usage over the previous 2000 seconds exceeds 90% of memory capacity. A rule 930 determines that the CPU is overloaded when the memory usage is currently above 70% of capacity.

Referring back to FIG. 8, when the server is not overloaded, client-side execution is denied using the process 840. When the server is overloaded, client-side execution is approved using a process 830. In some examples, the results of processes 830 and/or 840 may be represented by a Boolean variable. In the examples of FIG. 6, when client-side execution is approved, the CollaborationManager.processAtClientSide( ) call on line 630 would return true, but would return false when client-side execution is denied.

Referring back to FIG. 7 and process 715, when client-side execution is denied, the movable class is executed at the server beginning with a process 720. When client-side execution is approved, the movable class is executed at the client beginning with a process 730.

At the process 720, the movable class is accessed in movable class storage. When the service was deployed to the application server by method 400, the movable class was moved to the movable class storage during process 440. In some examples, the movable class storage may be the movable class storage 344. Using one or more data structures, the movable class storage locates the movable class corresponding to the proxy class that began execution during process 710. The movable class is then made available to the proxy class. In the examples of FIG. 6, line 650 shows the proxy class for ClassB accessing the corresponding movable class version in the movable class storage by providing a service and class name.

At a process 725, the movable class is executed at the server. Using the movable class accessed during process 720, the member function of the movable class is called using the same parameters as those used to invoke the corresponding member function of the proxy class. In the examples of FIGS. 5 and 6, the x and y values passed to getZ of the proxy class on line 520 are passed to getZ of the movable class on line 660. The results from the call to getZ of the movable class are then returned so that the proxy class returns the same result as the movable class. This ends execution of the proxy class that began during process 710. Method 700 then continues with a process 760 where processing of the service continues.

At the process 730, a partial response is created. In order to allow the client to provide collaborative execution of the movable class, several items are first returned to the client. These items may be returned to the client using a partial response, so called because even though the application server is responding to the service request received during process 705, execution of the full service request is not yet complete. To allow the client to collaboratively execute the movable class, the partial response is created, which includes the executable code for the movable class and a version of the software call that invoked movable class, including the parameters of the software call in serialized form. In some examples, one or more of the parameters may be provided by reference in the partial response by inclusion of a URL or similar identifier for each of the reference parameters. In some examples, the executable code for the movable class may be retrieved from the movable class storage using a process similar to process 720, but enhanced to retrieve the actual executable code rather than a reference to the executable code. In some examples, the executable code for the movable class may be similar to a class file. The software call and the serialized parameters are included in the partial response so that the client may invoke the call to the movable class just as it would be invoked at the server. In some examples, mark-up languages such as eXtensible Markup Language (XML), Simple Object Access Protocol (SOAP), Remote Procedure Call (RPC), Web Services Description Language (WSDL), and/or the like and/or variations of these may be used to include the software call and the parameters in the partial response. In the examples of FIGS. 5 and 6, the call to "CollaborationManager.getResultFromClient( . . . )" on line 640 shows identification of the movable class by service and class name, as well as the member function call and the values of x and y parameters as provided to the proxy member function via the call on line 520.

In some examples, the partial response may further include a final flag and/or indicator as to whether the collaborative execution of the movable class, as included in the partial response, would complete the processing for the service as made in the service request received during process 705.

At a process 735, the partial response is returned to the client. The partial response created during process 730 is returned to the client so that the client may collaboratively execute the movable class using the software call included in the partial response.

At a process 740, the movable class is executed at the client. The client executes the movable class by invoking the software call with the serialized parameters as included in the partial response. In some examples, if any of the parameters are passed by reference, they may be accessed as well.

At an optional process 750, it is determined whether processing of the service request is final. When execution of the software call included in the partial response includes the final processing steps for the service request, the client may use the results of the software call instead of a response to the service request. When this is the case, the client may not communicate further with the server to satisfy the service request. In some examples, the final flag and/or indicator included in the partial response during process 730 may be used at the client to determine that processing is final. When processing of the service request is final, the service request is completed at the client using a process 750. When processing of the service request is not final, a continuing request is returned to the server using a process 755.

At an optional process 755, the service request is completed at the client. Using the results from the collaborative execution of the software call included in the partial response, the client completes the processing for the service request from process 705 and provides the results to the client software at the client that made the service request.

At the process 755, a continuing request is received from the client. When the client completes the collaborative execution of the software call included in the partial response returned to the client during process 735, the client makes the results of the software call available to the server using a continuing request. Using serialization and/or the other techniques used to create the partial response during process 730, the client creates a continuing request to return the results of the software call to the server. In the examples of FIGS. 5 and 6, the results included in the continuing request are returned to the proxy class in the variable result on line 640 and then returned to the rest of the service as variable z in method1 at line 520. Further processing of the service then continues using process 760.

At the process 760, processing of the service completes at the server. After the movable class is collaboratively executed, either at the client or at the server, the rest of the service request is completed. In some examples, completing the service request may include further execution of one or more of the processes 710-755 as execution of the same and/or other proxy classes in the service begins.

At a process 765, a response is returned to the client. Once processing of the service request received during process 705 is complete, the application server may return the response to the client.

Some examples of server 310 and/or application server 340 may include non-transient, tangible, machine readable media that include executable code that when run by one or more processors (e.g., processor 320) may cause the one or more processors to perform the processes of methods 400 and/or 700 as described above. Some common forms of machine readable media that may include the processes of methods 400 and/or 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of processing a service request, the method comprising:
   receiving the service request at an application server running on a computer server, the service request being received from a client;
   beginning, by the application server, execution of a proxy member function of a proxy class, the proxy member function replacing a corresponding movable member function in a movable class;
   determining, by the application server after the execution of the proxy member function begins and in response to a request by the proxy member function, whether the movable member function is to be executed at the client;
   when the movable member function is to be executed at the client:
     creating, by the application server, a partial response comprising executable code for the movable class and information for invoking the movable member function; and
     transmitting, by the application server, the partial response to the client to allow the client to execute the movable member function;
   when the movable member function is not to be executed at the client:
     accessing, by the application server, the movable member function in movable class storage of the application server;
     executing, by the application server, the movable member function from the movable class storage; and
     returning, by the application server, a result of the movable member function as a result of the proxy member function.

2. The method of claim 1 wherein:
   the movable class and the proxy class have a same class name; and
   the movable member function and the proxy member function have a same signature.

3. The method of claim 1 wherein when the movable member function is to be executed at the client, the method further comprises:
   receiving, by the application server, a continuing request from the client;
   extracting, by the application server, the result of the movable member function from the continuing request; and
   returning the result of the movable member function as the result of the proxy member function.

4. The method of claim 1, further comprising:
   completing, by the application server, processing of the service request; and
   returning, by the application server, a result of the service request to the client.

5. The method of claim 4 wherein determining whether the movable member function is to be executed at the client comprises:
   determining, by the application server, whether the client is movable ready;
   determining, by the application server, whether the computer server is overloaded; and
   determining, by the application server, that the movable member function is to be executed at the client when the client is movable ready and the computer server is overloaded.

6. The method of claim 5 wherein determining whether the client is movable ready comprises determining whether the service request includes a movable ready status indicator.

7. The method of claim 5 wherein determining whether the client is movable ready comprises determining whether the client has previously registered with the application server that the client is movable ready.

8. The method of claim 5 wherein determining whether the computer server is overloaded comprises monitoring usage of one or more resources of the computer server.

9. The method of claim 8 wherein determining whether the computer server is overloaded further comprises evaluating one or more rules based on the monitored usage.

10. The method of claim 1 wherein when the movable member function is to be executed at the client, the method further comprises:
    including, by the application server, a final indicator in the partial response to indicate that the result from the movable member function is a result of the service request; and
    completing processing of the service request without further processing at the application server.

11. The method of claim 1 wherein creating the partial response comprises:
   serializing any parameters of the proxy member function; and
   including the serialized parameters in the partial response.

12. The method of claim 1 wherein creating the partial response comprises including a uniform resource locator associated with a by reference parameter of the proxy member function in the partial response.

13. A method of processing a service request, the method comprising:
   receiving a service for deployment by an application server running on a computer server;
   detecting, by the application server, that the service includes a movable class;
   extracting, by the application server, the movable class from the service;
   moving, by the application server, the movable class to movable class storage of the application server;
   creating, by the application server, a proxy class for the movable class, the proxy class having a same class name as the movable class and a same public interface as the movable class;
   replacing, by the application server, the movable class with the proxy class in the service;
   receiving, by the application server, the service request for the service at the application server, the service request being received from a client;
   beginning, by the application server, execution of a proxy member function of the proxy class, the proxy member function replacing a corresponding movable member function in the movable class;
   determining, by the application server after the execution of the proxy member function begins and in response to a request by the proxy member function, whether the movable member function is to be executed at the client;
   when the movable member function is to be executed at the client:
      creating, by the application server, a partial response comprising executable code for the movable class and information for invoking the movable member function; and
      transmitting, by the application server, the partial response to the client to allow the client to execute the movable member function;
   when the movable member function is not to be executed at the client:
      accessing, by the application server, the movable member function in the movable class storage of the application server;
      executing, by the application server, the movable member function from the movable class storage; and
      returning, by the application server, a result of the movable member function as a result of the proxy member function.

14. The method claim 13, further comprising modifying an interface description for the service that is made available by the application server.

15. The method claim 13 wherein detecting that the service includes the movable class comprises detecting a movable class identifying tag that is associated with the movable class.

16. The method claim 13 wherein detecting that the service includes the movable class comprises examining metadata information included in the service that identifies the movable class as movable.

17. The method claim 13 wherein moving the movable class to the movable class storage comprises updating one or more data structures for identifying and locating the movable class in the movable class storage based on a service name and a class name.

18. A non-transitory machine-readable medium comprising a first plurality of machine-readable instructions which when executed by one or more processors associated with an application server are adapted to cause the one or more processors to perform a method comprising:
   receiving a service request for a service at the application server, the service request being received from a client;
   beginning, by the application server, execution of a proxy member function of a proxy class, the proxy member function replacing a corresponding movable member function in a movable class;
   determining, by the application server after the execution of the proxy member function begins and in response to a request by the proxy member function, whether the movable member function is to be executed at the client;
   when the movable member function is to be executed at the client:
      creating, by the application server, a partial response comprising executable code for the movable class and information for invoking the movable member function; and
      transmitting, by the application server, the partial response to the client to allow the client to execute the movable member function;
   when the movable member function is not to be executed at the client:
      accessing, by the application server, the movable member function in movable class storage of the application server;
      executing, by the application server, the movable member function from the movable class storage; and
      returning, by the application server, a result of the movable member function as a result of the proxy member function.

19. The non-transitory machine-readable medium of claim 18, wherein the method further comprises:
   when the movable member function is to be executed at the client:
      receiving, by the application server, a continuing request from the client;
      extracting, by the application server, the result of the movable member function from the continuing request; and
      returning, by the application server, the result of the movable member function as the result of the proxy member function.

20. The non-transitory machine-readable medium of claim 18, wherein the method further comprises:
   receiving the service for deployment by the application server;
   detecting, by the application server, that the service includes the movable class;
   extracting, by the application server, the movable class from the service;
   moving, by the application server, the movable class to the movable class storage;
   creating, by the application server, the proxy class for the movable class, the proxy class having a same class name as the movable class and a same public interface as the movable class; and replacing, by the application server, the movable class with the proxy class in the service.

* * * * *